Oct. 22, 1968  C. G. B. GARRETT  3,407,297
INFRARED LASER BEAM DETECTION UTILIZING A CAVITY RESONATOR
Filed Jan. 18, 1967

AXIAL MODE

NON-AXIAL MODE

INVENTOR
C. G. B. GARRETT
BY
*David P. Kelley*
ATTORNEY

United States Patent Office 3,407,297
Patented Oct. 22, 1968

3,407,297
INFRARED LASER BEAM DETECTION UTILIZING A CAVITY RESONATOR
Charles G. B. Garrett, Morristown, N.J., assignor to Bell Telephone Laboratories, Incorporated, Berkeley Heights, N.J., a corporation of New York
Filed Jan. 18, 1967, Ser. No. 610,066
7 Claims. (Cl. 250—83.3)

ABSTRACT OF THE DISCLOSURE

An arrangement for detecting infrared radiation includes a cavity resonator formed by a metallic grid and an ellipsoidal mirror, and a temperature sensitive sample located at the near focal point of the mirror. Incident radiation, which is so delayed as to produce zero energy intensity on the resonator axis, is transmitted through the grid and oscillates between the grid and the mirror to be focused a plurality of times onto the sample.

Background of the invention

This invention relates to coherent light detectors and more specifically to infrared laser beam detectors.

Infrared detectors of the prior art, whether operating on photoconductive, bolometric or thermoelectric principles, generally suffer from slow response time. It is well known that the response time can be shortened by sacrificing sensitivity, but this solution is not satisfactory when it is desired to detect low level signals of the order of $10^{-11}$ watts, or smaller. To take a bolometric detector as an example, the minimum detectable infrared signal in the presence of thermal noise is given by $$\Delta W_{min.} \sim T_o \sqrt{k \Delta f C / \tau} \qquad (1)$$

where $T_o$ is the operating temperature, $k$ is Boltzmann's constant, $\Delta f$ is the receiver bandwidth, $C$ is the thermal capacity of the infrared sensitive material (hereinafter termed the sample), and $\tau$ is the detector response time. Clearly, where other variables are held constant, $$\tau \sim 1/(\Delta W_{min.})^2 \qquad (2)$$

According to Equation (2), then, to decrease response time it is necessary to sacrifice sensitivity, i.e., increase $\Delta W_{min.}$.

One solution to decreasing response time without sacrificing sensitivity is to reduce the thermal capacity $C$ (equivalent to the product of specific heat and volume) of the sample. For most nonlaser applications, reducing the thermal capacity is objectionable for at least two reasons. First, in nonlaser applications the incident light covers a large area; the sample must, therefore, also be correspondingly large which in turn implies a large thermal capacity. Second, in nonlaser applications the sample must be thick enough to absorb an appreciable fraction of the incident light. Again, this implies a large thermal capacity.

In the prior art, infrared laser beam detectors include photoconductors and bolometers both of which utilize changes in resistivity of doped germanium.

Summary of the invention

In the infrared laser beam detector of the present invention, the response time is decreased without sacrificing sensitivity by reducing the thermal capacity of the sample. The first difficulty mentioned above is alleviated by focusing the laser beam onto the sample, thereby allowing the material to be of much smaller volume and consequently of smaller thermal capacity. The second difficulty is alleviated by placing the sample in a resonant cavity, thereby to allow multiple reflections of the beam from the sample which in turn increases the absorption by the sample. In the nonlaser application the sample, having but one opportunity to detect the light, must be thick, whereas in the cavity arrangement the sample, having multiple opportunities, can be correspondingly smaller.

In an illustrative embodiment of the present invention, the detector comprises a cavity resonator formed by an ellipsoidal mirror and a grid coupling mirror. Placed within the cavity resonator at the near focal point of the ellipsoidal mirror is the sample. The grid coupling mirror is disposed half way between the near and far focal points of the ellipsoidal mirror, and at a point such that the sum of the distance from the ellipsoidal mirror to the sample plus the distance from the ellipsoidal mirror to the grid is an integral number of half wavelengths of the incident radiation. Placed outside the cavity resonator, and prior to the grid, are a pair of quadrant half wave plates which produce a cavity mode having vanishing energy intensity on the axis.

In operation, an infrared laser beam is transmitted through the quadrant half wave plates into the cavity resonator. The reflectivity of the grid is so chosen as to produce substantially zero reflected power. The beam transmitted through the grid oscillates between the two mirrors and is focused by the ellipsoidal mirror onto the sample. Changes in resistivity of the sensitive material of the sample correspond to amplitude modulated information carried by the beam and are then detected by appropriate electronic circuitry.

Description of the drawings

The invention, together with its various features and advantages, can be easily understood from the following more detailed discussion, taken in conjunction with the accompanying drawings, in which.

Detailed description of the invention

Figure 1:
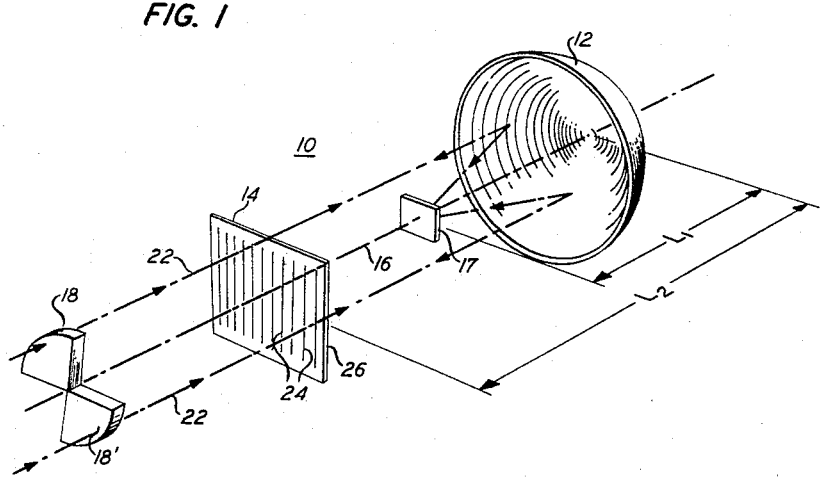
FIG. 1 is a perspective view of one embodiment of the invention.

In accordance with one embodiment, the infrared detector 10, shown in FIG. 1, comprises a cavity resonator formed by an ellipsoidal mirror 12 and a one dimensional grid coupling mirror, i.e., a grid 14 of the type disclosed in "Tunable Submillimeter Interferometers of the Fabry-Perot Type," by Ulrich et al., IEEE Transactions on Microwave Theory and Techniques, p. 363 (September 1963). The grid 14 is located on the resonator axis 16 and half way between the focal points of the ellipsoidal mirror 12 (which is also at a point of minimum beam diameter). Placed on the axis at the near focal point is a sample 17 of an infrared, temperature sensitive material.

The grid 14 is also located at a point such that the sum of the distance $L_1$ from the ellipsoidal mirror 12 to the sample 17 plus the distance $L_2$ from the ellipsoidal mirror 12 to the grid 14 is equal to an integral number of half wavelengths of the incident radiation. That is, $$L_1 + L_2 = m\lambda_o/2 \qquad (3)$$

where $m$ is a positive integer and $\lambda_o$ is the wavelength of the incident radiation.

In operation, an infrared laser beam 22 is transmitted through the plates 18–18' into the cavity resonator. The beam 22 then oscillates between the ellipsoidal mirror 12, the grid 14 and the sample 17. Upon each reflection from the ellipsoidal mirror 12, the beam 22 is focused onto the sample 17, which typically comprises a thin film of material, for example platinum, whose resistivity is temperature sensitive, deposited on an optically flat and polished substrate. The beam 22 is absorbed by the sample 17 (and reflected from the substrate) thereby causing changes in its resistivity which are detected by appropriate electronic circuitry, not shown, connected to the sample 17.

By positioning the grid 14 such that Equation (3) is satisfied, the cavity resonator supports oscillations of incident radiation of wavelength equal to $\lambda_0$. Since $\lambda_0$ is in the order of microns, there are a large number of wavelengths existing between the grid 14 and el ipsoidal mirror 12. It is therefore readily possible to position the grid 14 to satisfy Equation (3) and simultaneously to be half way between the focal points of the ellipscidal mirror 12.

The grid 14 typically comprises an array of parallel metal wires 24 (e.g., copper or nickel) deposited on a transparent substrate 26. The spacing $d$ (typically $10\mu$) between the parallel wires is such that $d \ll \lambda_0$. When this condition is satisfied, the grid 14 either reflects or transmits the incident radiation, but forms substantially no diffraction lobes which would undesirably produce energy losses, typically of the order of twenty percent.

The grid 14 is chosen to have a reflectivity to give critical coupling to the cavity resonator. That is, its reflectivity, typically about 90 percent, is designed to match the internal losses of the cavity. Under such conditions, critical coupling is achieved; that is, substantially no power is reflected by the grid.

In order to maximize the reflectivity, the incident beam 22 is preferably polarized with its electric vector parallel to the wires of the grid 14.

The grid 14 is preferably placed at a point of minimum beam diameter, which corresponds to a point midway between the focal points of the ellipsoidal mirror 12. Under this condition, the wave front of the beam is perpendicular to the grid 14 and consequently the beam is properly focused on the sample 17. Should the position of the grid 14 deviate from the midpoint, the beam would be focused at a point other than the near focal point, thereby reducing the detector sensitivity.

Figure 2:
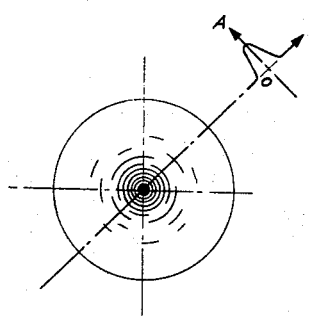
FIG. 2 shows an axial mode pattern of a laser beam.

The laser beam 22 may be transmitted in a Gaussian mode, i.e., an axial mode as shown in FIG. 2 having an energy distribution characterized by a Gaussian distribution function $\exp(-ar^2)$, $r$ being the radius of the beam cross section and $a$ being any real number. The Gaussian mode has maximum energy at zero radius (i.e., on the cavity axis) and as a consequence the sample 17, being located on the cavity axis, causes undesirable loss of energy.

Figure 3:
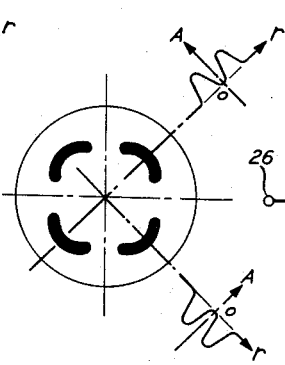
FIG. 3 shows a nonaxial mode pattern produced in the cavity by the pair of quadrant half wave plates.
Figure 4:
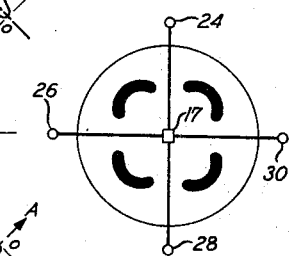
FIG. 4 shows a nonaxial mode pattern with the sample and its leads located in regions of substantially zero energy.

To alleviate this loss of energy it is preferable first to make the sample as small as possible, and second, to delay in phase the beam 22 in such a manner as to produce substantially zero energy on the cavity axis 16. The phase delay is affected by locating, for example, the tow quadrant-shaped plates 18–18', typically made of silicon, outside the cavity resonator. The velocity of propagation of the portion of the beam transmitted through the plates is decreased, and as a result that portion of the beam is phase delayed. The quadrant plate 18 is located in one quadrant of the beam and the quadrant plate 18' is located in the diametrically opposite quadrant. Each introduces a phase delay of $\pi \mod 2\pi$ (e.g., 180°) which results in a cavity mode as depicted in FIG. 3. The energy distribution of the mode is characterized by four energy peaks (shaded areas of FIG. 3), in each quadrant, and by zero energy on the cavity axis, as desired. The sample 17 located on the cavity axis, as shown in FIG. 4, introduces little, if any, energy loss since the energy on the axis is substantially zero. Such a cavity mode has the additional advantage of having substantially zero energy at angles 0, $\pi/2$, $\pi$, and $3\pi/2$, allowing leads 24, 26, 28 and 30 to be attached to the sample 17 with little energy loss. The leads in turn could be connected to appropriate electronic circuitry, and/or be used as mechanical supports.

The quadrant plates 18–18' are effectively delay lines and should introduce a determined delay into the beam 22 with little reflection or loss. A parallel-side plate, in general, having a refractive index $n$ and oriented normal to the beam introduces a phase delay $\varphi$ given by:

$$\varphi = 2\pi(n-1)l/\lambda_0 \quad (4)$$

where $l$ is the thickness of the plate and $\lambda_0$ is the wavelength of the incident radiation.

To reduce reflections it is desirable to make the optical thickness of the plate an integral number of wavelengths:

$$nl = (N/2)\lambda_0 \quad (5)$$

where N is an integer.

To delay the beam in phase by exactly $\pi \mod 2\pi$, requires $(n-1)l/\lambda_0$ of Equation (4) to be half an odd integer while simultaneously $2nl/\lambda_0$, from Equation (5), must be an integer. Thus, mathematically speaking it is necessary to find a pair of integers N and N' such that $$n/n-1 \to N/(2N'+1) \quad (6)$$

Consider, for example, plates 18–18' made of silicon which has a refractive index in the infrared of approximately 3.44. Substituting this value in Equation (6) we find that 3.44/2.44 is nearly the ratio of the integers 55/39; that is $N=55$ and $N'=19$. Substituting in Equation (5) indicates that a silicon plate 55/6.88 or $7.994 = l/\lambda_0$ wavelengths thick will produce a reflected beam of substantially zero and a phase delay, from Equation (4), of $(19.506)2\pi$ radians (i.e., about 177.7°). The departure from $\pi \mod 2\pi$ is then about 2°. For incident radiation $\lambda_0 = 100\mu$, the thickness of each silicon plate would be about 0.8 mm., a readily obtainable value.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, a high curvature spherical mirror could be used in place of the ellipsoidal mirror provided that the aberration thereby produced can be tolerated. Also the grid might comprise a two dimensional grid formed by a plurality of wires arranged in a checkerboard pattern, as disclosed in Ulrich, supra. In addition, by appropriately designing the dimensions of the cavity and associated components, it is possible to detect other than infrared radiation, e.g., microwave or visible.

I claim:

1. Apparatus for detecting laser beam radiation comprising
    a sample sensitive to the radiation,
    a cavity resonator including said sample disposed on the resonator axis,
    delay means disposed outside said resonator and in the path of the radiation for exciting said resonator in a mode having substantially zero energy intensity on the cavity axis,
    said cavity resonator comprising
        a reflector for focusing the beam onto said sample, and
        a grid disposed on the resonator axis such that the sum of the distance from said reflector to said sample plus the distance from said reflector to said grid is substantially an integral number of half wavelengths of the radiation to be detected, whereby the radiation transmitted through said grid oscillates between said grid and said reflector thereby to be focused a multiple of times by said reflector onto said sample.

2. The apparatus of claim 1 wherein said reflector comprises an ellipsoidal mirror having near and far focal points,
said grid is located half way between said near and far focal points, and
said sample is located at said near focal point.

3. The apparatus of claim 1 wherein
said reflector comprises a spherical mirror having a single focus, and
said sample is located at the focus.

4. The apparatus of claim 1 wherein said grid is located at a point of minimum beam diameter.

5. The apparatus of claim 1 wherein the reflectivity of said grid is chosen such that the energy reflected by said grid is substantially equal to the energy losses of said cavity resonator.

6. The apparatus of claim 1 wherein
said delay means introduces substantially $\pi$ mod $2\pi$ phase delay and comprises at least one parallel side plate oriented normal to the beam.

7. The apparatus of claim 6 wherein said plate has an optical thickness equal to an integral number of half wavelengths of the radiation.

References Cited

UNITED STATES PATENTS

| 3,035,175 | 5/1962 | Christensen | 250—83.3 |
| 3,055,257 | 9/1962 | Boyd et al. | 331—94.5 |
| 3,287,556 | 11/1966 | Good | 250—83.3 X |

ARCHIE R. BORCHELT, *Primary Examiner.*